(12) United States Patent
Elandt et al.

(10) Patent No.: US 11,904,471 B1
(45) Date of Patent: Feb. 20, 2024

(54) STABILIZATION OF A ROBOTIC SYSTEM IN AN UNSTABLE EQUILIBRIUM CONFIGURATION

(71) Applicant: Meta Platforms, Inc., Menlo Park, CA (US)

(72) Inventors: Ryan Blake Elandt, Ithaca, NY (US); Benjamin Lagosz-Sinclair, Tuxedo Park, NY (US); Jonathan M. Kuriloff, Hauppauge, NY (US)

(73) Assignee: Meta Platforms, Inc., Menlo Park, CA (US)

( * ) Notice: Subject to any disclaimer, the term of this patent is extended or adjusted under 35 U.S.C. 154(b) by 167 days.

(21) Appl. No.: 17/363,255

(22) Filed: Jun. 30, 2021

Related U.S. Application Data

(60) Provisional application No. 63/048,787, filed on Jul. 7, 2020, provisional application No. 63/048,793, filed on Jul. 7, 2020.

(51) Int. Cl.
| | | |
|---|---|---|
| *B25J 9/16* | (2006.01) | |
| *B25J 5/02* | (2006.01) | |
| *H02G 1/04* | (2006.01) | |
| *G02B 6/48* | (2006.01) | |

(52) U.S. Cl.
CPC ............... *B25J 9/1638* (2013.01); *B25J 5/02* (2013.01); *G02B 6/48* (2013.01); *H02G 1/04* (2013.01)

(58) Field of Classification Search
CPC .......... B25J 9/1638; B25J 5/02; B25J 19/023; G02B 6/48; G02B 6/486; H02G 1/02; H02G 1/04; H02G 1/06; H02G 7/10; H02G 7/02; B23P 19/067
USPC .................................. 254/134.3 R, 134.3 CL
See application file for complete search history.

(56) References Cited

U.S. PATENT DOCUMENTS

| | | | | |
|---|---|---|---|---|
| 4,715,582 | A * | 12/1987 | Ikeda | ....................... H02G 1/02 254/134.3 CL |
| 2020/0358268 | A1 * | 11/2020 | Kuriloff | ................. G02B 6/486 |

* cited by examiner

*Primary Examiner* — Tyrone V Hall, Jr.
*Assistant Examiner* — Abbie E Quann
(74) *Attorney, Agent, or Firm* — Greenberg Traurig, LLP

(57) ABSTRACT

The disclosed systems for suspending cable (e.g., fiber optic cable) from an overhead powerline may include a payload subsystem for housing and dispensing a cable, a rotation subsystem for winding the cable around the powerline, an extension subsystem for raising at least a portion of the payload subsystem vertically upward from the powerline, a stabilization subsystem for stabilizing the system at least when the payload system is extended away from the powerline by the extension subsystem, and a drive subsystem for driving the system along the powerline. Various other related systems, devices, mechanisms, and methods are also disclosed.

11 Claims, 9 Drawing Sheets

STABILIZATION OF A ROBOTIC SYSTEM IN AN UNSTABLE EQUILIBRIUM CONFIGURATION

CROSS-REFERENCE TO RELATED APPLICATIONS

This application claims the benefit of U.S. Provisional Patent Application No. 63/048,793, titled "STABILIZATION OF A ROBOTIC SYSTEM IN AN UNSTABLE EQUILIBRIUM CONFIGURATION," filed on 7 Jul. 2020, and also claims the benefit of U.S. Provisional Patent Application No. 63/048,787, titled "ROBOTIC SYSTEM OBSTACLE RECOGNITION," filed 7 Jul. 2020, the entire disclosure of each of which is incorporated herein by this reference.

BRIEF DESCRIPTION OF DRAWINGS

The accompanying drawings illustrate a number of example embodiments and are a part of the specification. Together with the following description, these drawings demonstrate and explain various principles of the present disclosure.

Figure 1:
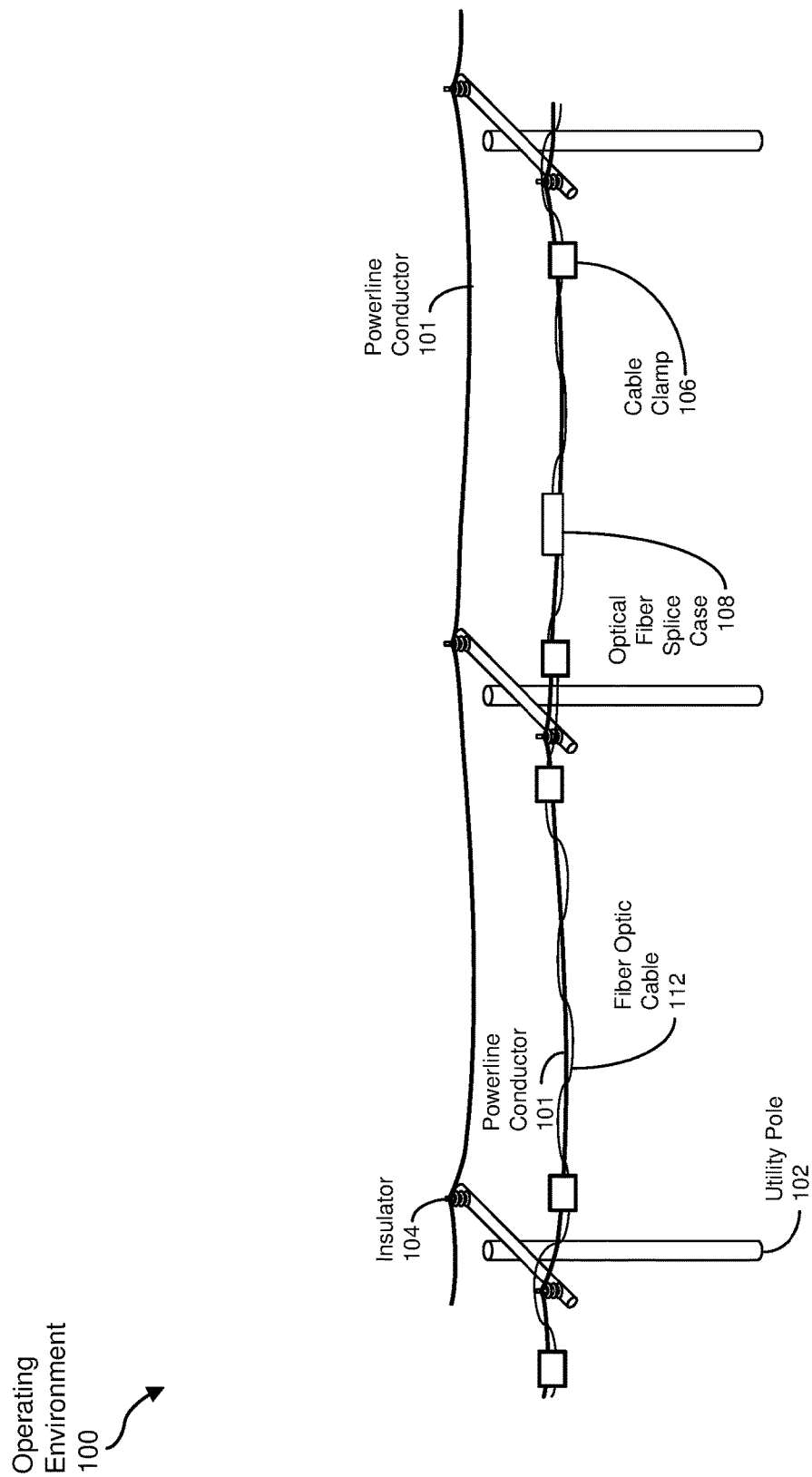
FIG. 1 is a graphical representation of an example operating environment, including a powerline, in which various example embodiments may be employed, according to at least one embodiment of the present disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within this disclosure.

DETAILED DESCRIPTION OF EXAMPLE EMBODIMENTS

Robotic devices may be employed to install fiber optic cable onto preexisting power infrastructure, such as overhead powerline conductors (also referred to herein as "powerlines") for electrical power transmission and distribution lines, by way of helically wrapping the fiber optic cable about the powerline. Such an installation may benefit from the use of the preexisting right-of-way and corresponding infrastructure (e.g., power conductors, electrical towers or poles, and so on) associated with the electrical power distribution system. Such a robotic device may include, in some examples, a drive subsystem that causes the robotic device to travel along the powerline (e.g., between towers or poles) while a rotation subsystem of the device helically wraps the fiber optic cable about the conductor.

While translating along a powerline during fiber optic cable installation, conventional robotic devices may encounter one or more obstacles (e.g., insulators, taps, and the like), especially along powerlines of electrical distribution systems. In such cases, human operators may intervene to temporarily remove and then reattach the robotic device to allow the robotic device to continue to install the fiber optic cable on the powerline beyond the encountered obstacle.

The present disclosure is generally directed to robotic systems and associated methods for installing fiber optic cable on a powerline. As will be explained in greater detail below, embodiments of the present disclosure may stabilize the robotic system while the system is in an unstable equilibrium configuration to facilitate obstacle avoidance during the fiber optic cable installation process, thus potentially reducing the amount of human intervention required to allow the robotic device to install the fiber optic cable. Consequently, for this reason and others described below, fiber "make ready" costs (e.g., costs incurred in preparing a utility powerline for installation of fiber optic cable and subsequently installing the fiber optic cable) may be significantly reduced.

Features from any of the embodiments described herein may be used in combination with one another in accordance with the general principles described herein. These and other embodiments, features, and advantages will be more fully understood upon reading the following detailed description in conjunction with the accompanying drawings.

The following will provide, with reference to FIGS. 1-9, detailed descriptions of systems and methods for stabilizing a robotic system in an unstable equilibrium configuration to facilitate installation of fiber optic cable on a powerline. A brief description of an example operating environment in which various embodiments of systems and methods for installing fiber optic cable may operate is provided in connection with FIG. 1. Example robotic systems for installing fiber optic cable are discussed in conjunction with FIGS. 2-5. In association with FIG. 6, an example method of obstacle avoidance is described. An example method of stabilization is described with reference to FIG. 7. An example robotic system and an associated example stabilization system are discussed in connection with FIGS. 8 and 9, respectively.

FIG. 1 is a graphical representation of an example operating environment 100 in which various embodiments disclosed herein may be utilized. As depicted in the example of FIG. 1, the operating environment 100 may include an electrical power transmission or distribution system having a plurality of utility poles 102 carrying multiple powerlines 101. Examples of powerlines 101 may include stranded cables, but the powerlines 101 are not restricted to such embodiments. While any number of powerlines 101 may be carried via the utility poles 102, two powerlines 101 are illustrated in FIG. 1 for visual simplicity. In some examples, the powerlines 101 are mechanically coupled to the utility poles 102 via insulators 104, although other types of components (e.g., taps, standoffs, etc.) may be employed in various embodiments. While specific reference is made herein to the utility poles 102, any type of utility pole, H-frame, lattice tower, or other type of pole or tower that carries or supports one or more powerlines 101 may be included and covered in various embodiments of the operating environment 100 discussed herein. Additionally, the powerlines 101 may include one or more phase conductors, ground wires, static wires, or other conductors supported by the utility poles 102, towers, or the like.

Also shown in FIG. 1 is a fiber optic cable 112 aligned with, and mechanically coupled to, the powerline 101. In some embodiments, the fiber optic cable 112 may be helically wrapped about the powerline 101, such as by way of a human-powered or electrically powered robotic device. However, other physical relationships between the powerline 101 and the fiber optic cable 112 are also possible. While only one fiber optic cable 112 is depicted in FIG. 1, multiple powerlines 101 employing the same utility poles 102 may each have a corresponding fiber optic cable 112 or multiple fiber optic cables 112 attached or otherwise coupled thereto.

As depicted in FIG. 1, the fiber optic cable 112 may be secured to the powerline 101 via one or more cable clamps 106. In some examples, the fiber optic cable 112 may follow a powerline 101 associated with a particular phase of the power being transmitted, or the fiber optic cable 112 may alternate between two or three different phases. Moreover, each fiber optic cable 112 may carry one or more optical fibers for facilitating communication within and across the operating environment 100.

Additionally, FIG. 1 illustrates an optical fiber splice case 108 that, in some embodiments, splices together corresponding ends of optical fibers of the fiber optic cable 112. For example, relatively long stretches (e.g., multiple-kilometer spans) of fiber optic cable 112 that may be coupled to the powerline 101 may be mechanically coupled together, thermally fused together, or otherwise coupled in the optical fiber splice case 108, which may include optical couplers, amplifiers, and/or other components to facilitate transmission of optical data signals from one span of the fiber optic cable 112 to the next.

Additionally, in some embodiments, the optical fiber splice case 108 may include wireless access points and other networking components (e.g., for communication with Internet of Things (IoT) devices, smart grid sensors (e.g., voltage sensors, current sensors, and the like), and user access networks). Moreover, the optical fiber splice case 108 may include optical, electromagnetic, and other types of sensors to measure powerline conditions; environmental sensors for measuring temperature, humidity, and so on; video cameras for surveillance; and the like. To power such components, the optical fiber splice case 108 may also include solar cells and/or batteries. In some examples, such as that shown in FIG. 1, the optical fiber splice case 108 may be attached to, or positioned on or near, the powerline 101, as opposed to being mounted on a lower portion of the utility pole 102, thus potentially eliminating the use of a phase-to-ground transition that otherwise may be coupled with each length of the fiber optic cable 112 to provide electrical isolation from the powerline 101.

Figure 2:
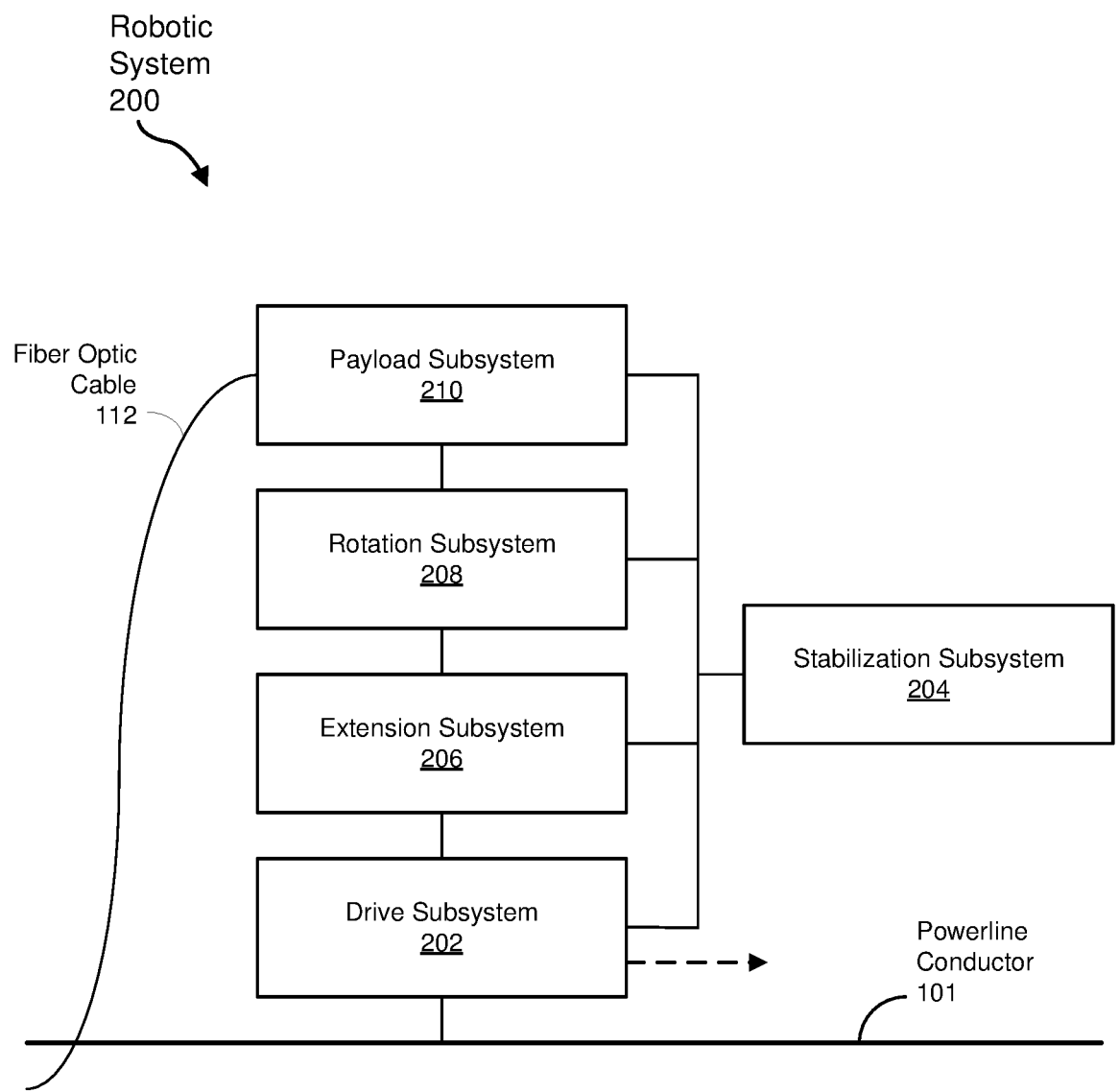
FIG. 2 is a block diagram of an example robotic system for installing fiber optic cable along a powerline, according to at least one embodiment of the present disclosure.

FIG. 2 is a block diagram of an example robotic system 200 for installing fiber optic cable (e.g., the fiber optic cable 112) along an overhead powerline (e.g., the powerline 101). As depicted in FIG. 2, the robotic system 200 may include a drive subsystem 202, a stabilization subsystem 204, an extension subsystem 206, a rotation subsystem 208, and/or a payload subsystem 210. In some embodiments, FIG. 2 provides a general representation of how the subsystems 202-210 are mechanically coupled to each other, although other examples may possess alternative connection arrangements.

In some embodiments, the drive subsystem 202 may translate the robotic system 200 along the powerline 101. Also, in some examples, the extension subsystem 206 may mechanically couple the rotation subsystem 208 to the drive subsystem 202 and selectively extend the rotation subsystem 208, along with the payload subsystem 210, away from the drive subsystem 202 and/or the powerline 101 to avoid obstacles (e.g., insulators 104) along the powerline 101. The rotation subsystem 208, in some examples, may rotate the payload subsystem 210, which may in turn carry a segment of the fiber optic cable 112, about the powerline 101 while the drive subsystem 202 translates along the powerline 101 such that the segment of the fiber optic cable 112 is helically wrapped about the powerline 101.

The stabilization subsystem 204 may include one or more stabilization components (e.g., one or more thrusters, gyroscopes, inertial measurement units (IMUS), controllers, processors, or the like) that may help attain or maintain a desired position of the robotic system 200 relative to the powerline 101. As described in greater detail below, the desired position may be directly above the powerline 101 (e.g., with a center of gravity of the robotic system 200 directly above the powerline 101). Further, in some examples, the stabilization components may be employed at least during times when the extension subsystem 206 is extending the rotation subsystem 208 (and, consequently, the payload subsystem 210) away from (e.g., vertically above) the powerline 101, such as to avoid an obstacle.

Figure 3:
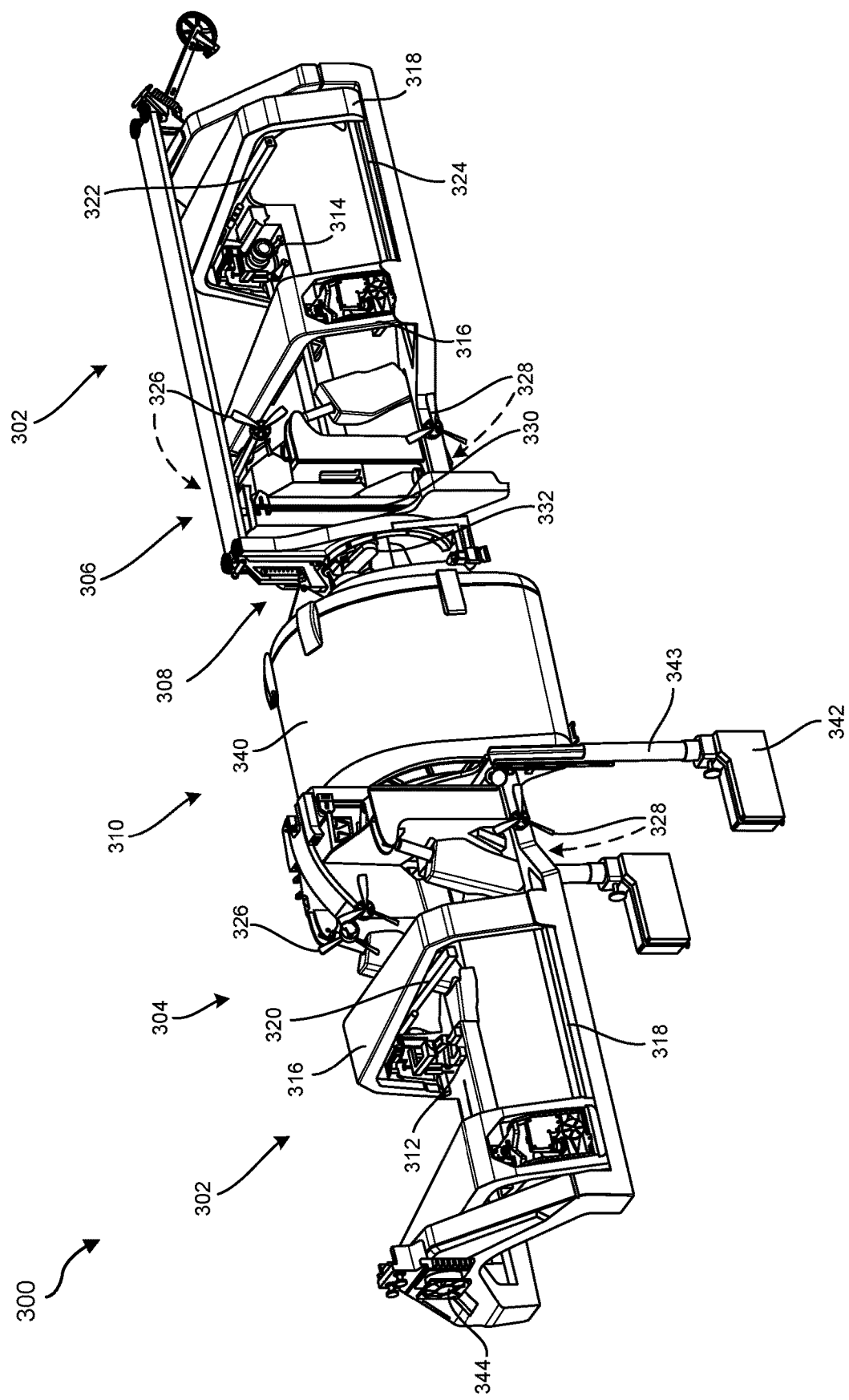
FIG. 3 is a perspective view of an example robotic system for installing fiber optic cable along a powerline, according to at least one embodiment of the present disclosure.

FIG. 3 is a perspective view of an example robotic system 300 for installing fiber optic cable along a powerline. The robotic system 300 may include a drive subsystem 302, a stabilization subsystem 304, an extension subsystem 306, a rotation subsystem 308, and a payload subsystem 310.

The drive subsystem 302 may be configured to drive the robotic system 300 along a powerline (e.g., the powerline 101) as the rotation subsystem 308 rotates the payload subsystem 310 to deploy a fiber optic cable (e.g., fiber optic cable 112) along and around the powerline. The drive subsystem 302 may be implemented in a variety of ways. For example, the drive subsystem 302 may include one or more rollers, grippers, actuators, conveyers, pulleys, etc., that may be arranged and operated to move the robotic system 300 along the powerline. In the example shown in FIG. 3, the drive subsystem 302 may include grippers 312 and rollers 314 that are configured to clamp onto the powerline and to drive the robotic system 300 along the powerline. The rollers 314 may be powered and/or unpowered. The grippers 312 may be mounted on a gripper frame element 316, and the rollers 314 may be mounted on a roller frame element 318.

The grippers 312 may be laterally (e.g., perpendicular to the powerline) movable along a gripper rail 320 affixed to the gripper frame element 316. The rollers 314 may be laterally movable along a roller rail 322 affixed to the roller frame element 318. The roller frame element 318, and consequently the roller rail 322 and the rollers 314, may be axially (e.g., parallel to the powerline) movable along a frame rail 322 relative to other portions of the robotic system 300. The drive subsystem 302 may include one or more grippers 312 and/or rollers 314 in a first end portion (e.g., to the left in the perspective of FIG. 3) of the robotic system 300 and one or more grippers 312 and/or rollers 314 in a second, opposite end portion (e.g., to the right in the perspective of FIG. 3) of the robotic system 300.

During operation, the grippers 312 may grip the powerline to stabilize the robotic system, such as during an obstacle avoidance maneuver. To engage with the powerline, the grippers 312 may be moved from a retracted (e.g., outward) position inward toward the powerline along the gripper rail 320. To drive the robotic system 300 along the powerline, at least one of the rollers 314 may be engaged with the powerline and may be caused to rotate. The rollers 314 may be translated axially along the frame rail 324 during an obstacle avoidance maneuver to keep the rollers 314 in contact with the powerline for stability. The rollers 314 may also be disengaged and moved laterally outward to avoid obstacles. After the obstacle is passed by the rollers 314, the rollers 314 may then be moved back into position to engage with the powerline for continued driving of the robotic system 300 along the powerline.

The stabilization subsystem 304 may be configured to stabilize the robotic system 300 along the powerline as the robotic system 300 is driven along the powerline and/or during an obstacle avoidance maneuver. The stabilization subsystem 304 may be implemented in a variety of ways. For example, the stabilization subsystem 304 may include upper actuators 326 (e.g., thrusters, fans, gyroscopes, etc.) that are positioned to be above the powerline, at least during certain obstacle avoidance maneuvers. As shown in FIG. 3, the stabilization subsystem 304 may include four upper actuators 326, although other embodiments may include a different number of upper actuators 326. The upper actuators 326 may be configured to force air laterally away from the robotic system 300, resulting in an opposing force against a frame of the robotic system 300. The upper actuators 326 may be configured to be selectively driven (e.g., activated, deactivated, driven at different speeds, etc.) to stabilize a rolling of the robotic system 300, such as about the powerline.

The robotic system 300 may, at least during some operations (e.g., during an obstacle avoidance maneuver), have a center of gravity that is vertically above the powerline. This may cause the robotic system 300 to be unstable when the robotic system 300 is supported by the powerline. For example, if the center of gravity of the robotic system 300 deviates to a side (e.g., due to wind or operational movements) and the center of gravity is not directly above the powerline, the robotic system 300 may tend to roll about the powerline. The stabilization subsystem 304 may be configured to counteract such rolling instabilities.

The upper actuators 326 may be positioned away from the powerline to be able to apply a rotational force to the robotic system 300. For example, the upper actuators 326 may be above the center of gravity of the robotic system 300 during an obstacle avoidance maneuver. Thus, as the center of gravity moves out of alignment with the powerline and the robotic system 300 begins to roll, the upper actuators 326 may be driven to force air in the direction of the rolling motion to force the robotic system back into a stable position with the center of gravity directly above the powerline. In some examples, at least some of the upper actuators 326 may be mounted to a portion of the frame that may be extended (e.g., raised) by the extension subsystem 308. Thus, as the extension subsystem 308 is activated to raise a portion of the robotic system 300 (e.g., the payload subsystem 310), such as to avoid an obstacle, at least some of the upper actuators 326 may also be raised. This may enable the upper actuators 326 to apply a greater torque to the robotic system 300 corresponding to a greater instability that may occur when a center of gravity of the robotic system 300 is increasingly higher than the powerline. In additional examples, at least some of the upper actuators 326 may be positioned on the frame to be above the powerline, but may be mounted to a fixed section of the frame (e.g., a portion of the frame that is not raised by the extension subsystem 308).

The upper actuators 326 may also be configured to roll the robotic system 300 about the powerline to reposition the robotic system 300 relative to the powerline. For example, during normal operation in which a fiber optic cable is deployed along the powerline, the robotic system 300 may be inverted compared to the orientation shown in FIG. 3 to translate along the powerline in a stable position (e.g., with a center of gravity below the powerline). When an obstacle to be avoided, such as an insulator supporting the powerline from below, is detected along a bottom of the powerline, the upper actuators 326 may be operated to rotate the robotic system 300 about the powerline to attain the orientation shown in FIG. 3. In this orientation, the center of gravity of the robotic system 300 may be above the powerline and may therefore be in an unstable position. The upper actuators 326 may be operated to maintain the robotic system 300 in this unstable position throughout an obstacle avoidance maneuver.

In some embodiments, the stabilization subsystem 304 may also include lower actuators 328 (e.g., thrusters, fans, gyroscopes, etc.). The lower actuators 328 may be positioned on the frame of the robotic system 300 to be closer to the powerline than the upper actuators 326. The lower actuators 328 may be positioned and configured to be selectively driven to stabilize a sway of the robotic system 300. For example, due to the flexibility of the powerline, the robotic system 300 and the powerline may tend to laterally sway, such as in response to wind or operational movements of the robotic system 300. The lower actuators 328 may be configured to counteract the swaying by forcing air in a direction of the sway, resulting in a force that pushes back against the swaying motion.

As noted above, the robotic system 300 may be normally operated in an inverted orientation compared to the orientation shown in FIG. 3. In some examples, the lower actuators 328 may also be actuated to assist in rotating the robotic system 300 about the powerline to position the robotic system 300 in the pose (e.g., orientation) shown in FIG. 3.

The extension subsystem 306 may be configured to move at least the payload subsystem 310 to avoid obstacles. The extension subsystem 306 may be implemented in a variety of ways. For example, the extension subsystem 306 may include extension rails 330 along which the payload subsystem 310 may be extended (e.g., raised or lowered, depending on the pose of the robotic system 300). An extension actuator 332 (e.g., a servo motor, a piston, etc.) may be used to extend the payload subsystem 310 along the extension rails 330.

The rotation subsystem 308 may be configured to rotate the payload subsystem 310 to enable the payload subsystem 310 to wrap fiber optic cable around the powerline as the robotic system 300 progresses along the powerline. The rotation subsystem 308 may be implemented in a variety of ways. For example, the rotation subsystem 308 may include a rotation actuator (e.g., a motor, a gear, pulleys, belts, etc.) that is operatively coupled to the payload subsystem 310.

The payload subsystem 310 may be configured to house fiber optic cable for deployment along the powerline. The payload subsystem 310 may be implemented in a variety of ways. For example, the payload subsystem 310 may include a spool of fiber optic cable within a payload housing 340. In some embodiments, the payload housing 340 may generally have a U-shape, with a lower opening that can be positioned to extend around the powerline.

While operating in a fiber optic cable deployment mode, the robotic system 300 may be moved along a powerline by the drive subsystem 302. Simultaneously, the rotation subsystem 308 may rotate the payload subsystem 310. The fiber optic cable within the payload subsystem 310 may be deployed from the payload subsystem 310 and wrapped around the powerline. During operation in the fiber optic cable deployment mode, the stabilization subsystem 304 may maintain the robotic system 300 in a desired (e.g., upright) orientation.

While operating in an obstacle avoidance mode, the rotation subsystem 308 may stop rotating the payload subsystem 310 and the extension subsystem 306 may lift the payload subsystem 310 high enough to avoid contacting the obstacle. The stabilization subsystem 304 may be used to maintain the robotic system in a desired (e.g., upright) orientation. The drive subsystem 302 may be used to move the robotic system 300 past the obstacle, after which the extension subsystem 306 may lower the payload system 310 back into its initial position to deploy fiber optic cable. The rotation subsystem 308 may resume rotating the payload subsystem 310 about the powerline and the drive subsystem 302 may continue to drive the robotic system along the powerline.

The robotic system 300 may also include additional features and elements. For example, a power source (e.g., one or more batteries 342) may be included to provide power to the other subsystems to enable the robotic system 300 to operate. In some examples, as illustrated in FIG. 3, the batteries 342 may be positioned on battery rails 343 that extend downward (in the orientation shown in FIG. 3), such that the batteries 342 are below the powerline during at least some operations (e.g., during an obstacle avoidance maneuver). This configuration may improve a stability of the robotic system by lowering a center of gravity of the robotic system 300. In addition, the robotic system 300 may include one or more control elements, such as processors, controllers, communication interfaces (e.g., for wireless or wired communication), memory, etc.

In some examples, the robotic system 300 may include at least one controller 344 configured to control the actuators 326, 328 of the stabilization subsystem 304. For example, the controller(s) 344 may include at least one proportional-integral-derivative (PID) controller 344 operatively coupled to the actuators 326, 328 to operate the actuators 326, 328 at appropriate actuator speeds to maintain the robotic system 300 in a desired pose (e.g., with a center of gravity laterally aligned with the powerline). The controllers 344 may receive feedback from one or more sensors, such as an inertial measurement unit (IMU) 346. The IMU 346 may include one or more accelerometers, gyroscopes, etc., configured to sense a pose (e.g., rotational orientation, translational position, etc.) of the robotic system 300. As the IMU 346 senses that the robotic system 300 rolls or sways, the controllers 344 may operate the actuators 326 and/or 328 to apply a force against a frame of the robotic system 300 to re-orient the robotic system 300 to a desired (e.g., upright) pose.

Figure 4:
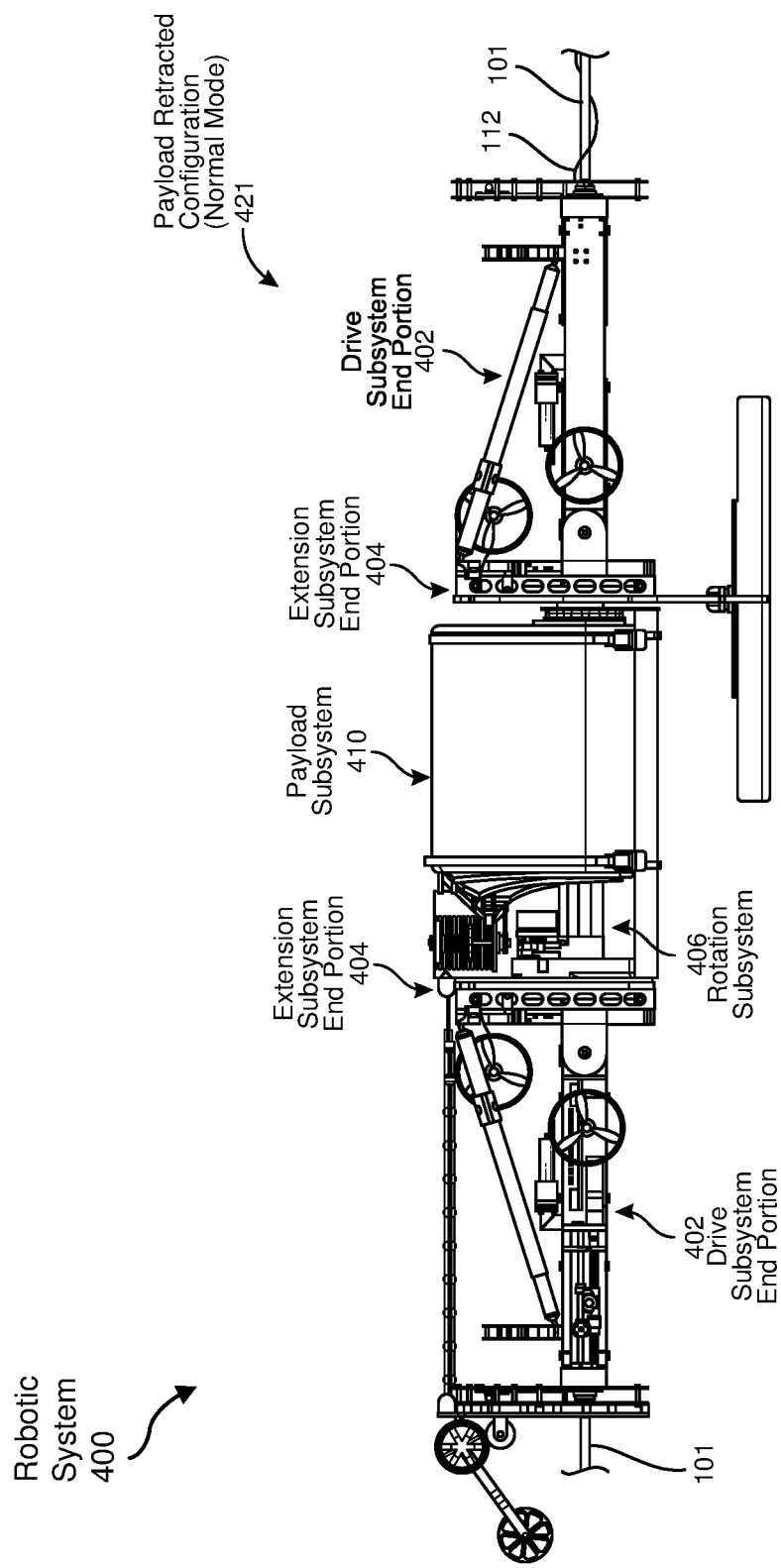
FIG. 4 is a side view of an example robotic system that may install a segment of fiber optic cable about a powerline, where the robotic system is in a payload retracted configuration (e.g., a normal operating mode), according to at least one embodiment of the present disclosure.
Figure 5:
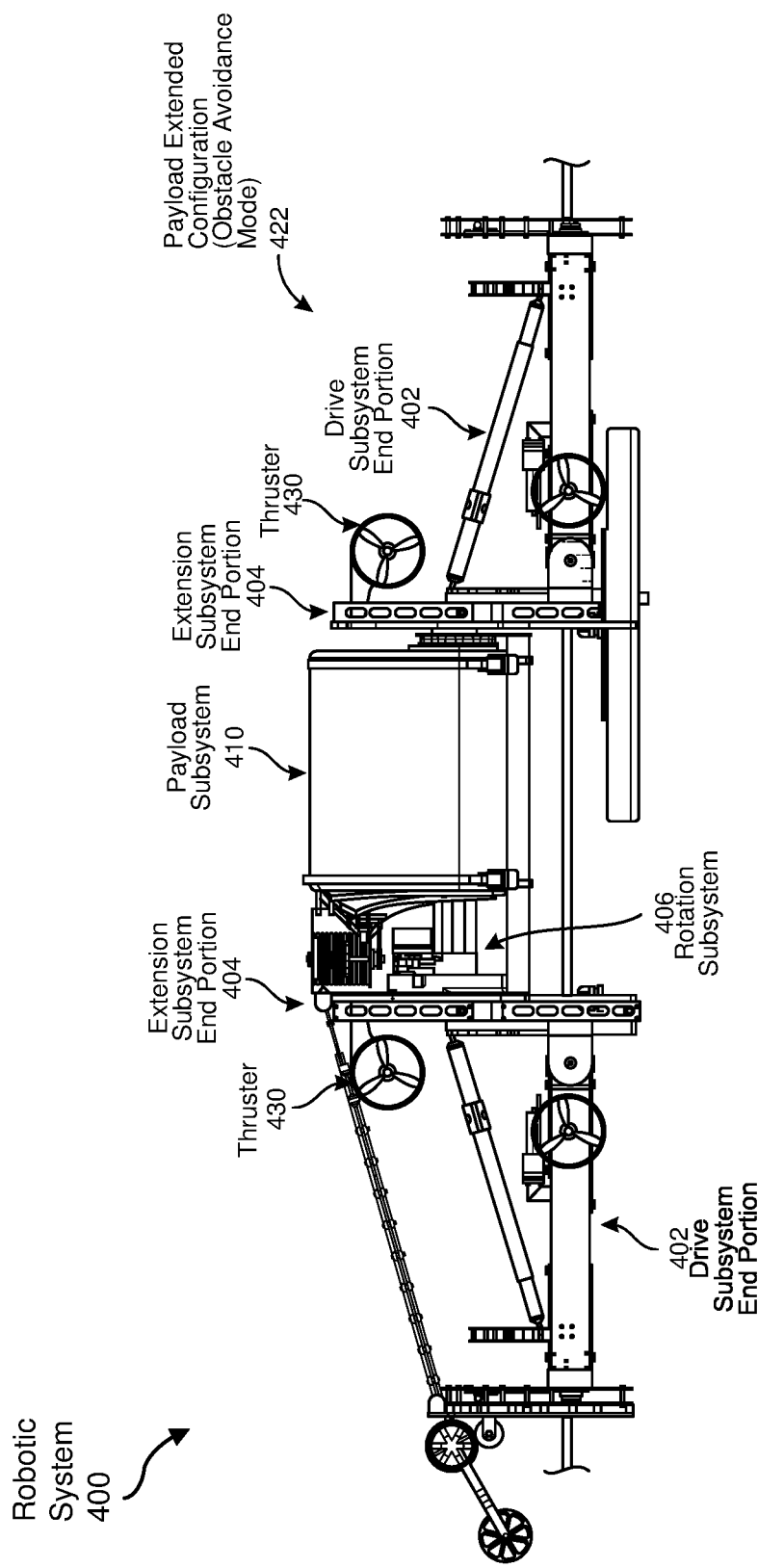
FIG. 5 is a side view of the robotic system of FIG. 4 with the payload subsystem in a payload extended configuration (e.g., an obstacle avoidance mode), according to at least one embodiment of the present disclosure.

FIGS. 4 and 5 are side views of associated configurations of an example robotic system 400, which may serve as an embodiment of the robotic system 200 of FIG. 2, as described above. As illustrated in FIGS. 4 and 5, the drive subsystem 202 may include separate drive subsystem end portions 402, and the extension subsystem 206 may include separate extension subsystem end portions 404 mechanically coupled to the corresponding drive subsystem end portions 402. In some embodiments, the robotic system 400 may include a first (e.g., leading or fore) end and a second (e.g., trailing or aft) end that may be determined by a direction in which the robotic system 400 translates along the powerline 101, with each end corresponding to a drive subsystem end portion 402 and an extension subsystem end portion 404. Additionally, a rotation subsystem 406 (e.g., serving as rotation subsystem 208 of FIG. 2), or some portion thereof, may be coupled at opposing ends to the extension subsystem end portions 404. Further, a payload subsystem 404 (e.g., serving as payload subsystem 210 of FIG. 2) carrying a segment of fiber optic cable 112 may be connected to, and held within, the rotation subsystem 306.

During normal operation (e.g., while not in an obstacle-avoidance scenario), the robotic system 400 may be in a payload retracted configuration 421, as depicted in FIG. 4, in which both of the drive subsystem end portions 402 are in a retracted (non-extended) position, and in which at least one drive subsystem end portion 402 may propel the robotic system 400 along the powerline 101 while the rotation subsystem 406 may rotate the payload subsystem 410 about its longitudinal axis that substantially aligns with the powerline 101 and while the payload subsystem 410 pays out a segment of fiber optic cable 112, resulting in the segment of the fiber optic cable 112 being helically wrapped about the powerline 101. In addition, in some examples, the extension subsystem end portions 404 may retain the rotation subsystem 406 in a retracted state so that the rotation subsystem 406 and the payload subsystem 410 remain close to the powerline 101, thus increasing the physical stability of the system while installing the fiber optic cable 112.

In some embodiments, each of the drive subsystem end portions 402 may be independently operated in a retracted state (e.g., as illustrated in FIG. 4) or an extended state (e.g., longitudinally along powerline 101 to facilitate obstacle avoidance by extending beyond an obstacle) and to selectively engage or release powerline 101 while bypassing an obstacle. Other examples may not include extendable or retractable versions of the drive subsystem end portions 402.

FIG. 5 is a side view of the robotic system 400 in a payload extended configuration 422 (e.g., an obstacle avoidance mode), in which the extension subsystem end portions 404 extend the payload subsystem 410 away (e.g., upward) from the drive subsystem end portions 402 and the powerline 101 as the drive subsystem end portions 402 translate the robotic system 400 along the powerline 101, thus allowing the rotation subsystem 406 (and, consequently, the payload subsystem 410) to pass over the obstacle. In addition, in some examples, the rotation subsystem 406 may include one or more stabilizing components (e.g., the upper actuators 430) to stabilize the orientation of the rotation subsystem 406, and thus the robotic system 400, such as by maintaining the current rotational position of the robotic system 400 relative to the powerline 101 (e.g., in the orientation illustrated in FIGS. 4 and 5). In some embodiments, the rotation subsystem 406 may provide stabilization only while the extension subsystem end portions 404 extend the rotation subsystem 406 upward or may provide such stabilization at other times as well.

In some embodiments, one or more components of the robotic system 400 that are primarily employed by the robotic system 400 for functions not directly associated with stabilization may be utilized to provide such stabilization. For example, components used for translation of the robotic system 400 along the powerline 101 (e.g., drive wheels and corresponding motors that clamp or otherwise engage the powerline 101 as part of the drive subsystem end portions 402) may be also configured to translate in a direction parallel to the ground and orthogonal to the powerline 101 relative to other portions of the robotic system 400, such as the extension subsystem end portions 404 and the rotation subsystem 406. In the payload extended configuration 422 and during an obstacle avoidance maneuver, the drive wheels may thus be located significantly below a center of gravity of the robotic system 400. Consequently, shifting the drive wheels horizontally in a direction toward which the payload subsystem 410 begins to tilt may counteract the tilt, resulting in a stabilization force being applied to the robotic system 400 to maintain the robotic system 400 in an upright pose.

To successfully balance the robotic system 400 at least while in the payload extended configuration 422, a control method may be employed that utilizes one or more mathematical models representing the robotic system 400 and powerline 101. For example, the robotic system 400 may be modeled as an inverted pendulum balancing on a vibrating string (e.g., representing the powerline 101), thus obeying the wave equation. In some embodiments, the mathematical model may be created by joining a finite element method (FEM) model of a vibrating string with a rigid-object model of an inverted pendulum on a cart on the string. In some examples, these models may be joined to form a unified model by algebraically eliminating a shared constraint force from separate equations of motion (EOM). Further, in some embodiments, the rigid-object model for the robotic system 400 may include a model for one or more actuators (e.g., the actuators 430, gyroscopes, or the like) that may impose force on the robotic system 400 to stabilize robotic system (e.g., in an upright position over the powerline 101).

In some embodiments, the unified model may then be used to create a balance controller (e.g., using an "H-infinity" (H—) control method and/or a PID control method) that may be parameterized or adjusted for the circumstances in which the robotic system 400 is currently employed. To that end, in some examples, for each obstacle crossing requiring extension of the payload subsystem 410 upward, the robotic system 400 may determine a vibration frequency induced by the robotic system 400 by intentionally causing the powerline 101 to vibrate (e.g., at the fundamental frequency). The robotic system 400 may then utilize the determined frequency to estimate a tension of the powerline 101.

In turn, in some examples, this estimated tension may be used with other parameters including the span length of the powerline 101 (e.g., between utility poles 102), the amount of fiber optic cable 112 remaining in the payload subsystem 410, the position of the robotic system 400 along powerline 101, and/or other parameters associated with the robotic system 400 to calculate a mathematical model specifically for the current obstacle crossing. Based on that model, an H-infinity controller and/or PID controller may be created for each crossing to stabilize the robotic system 300 in the upright extended configuration. In some examples, the mathematical model may specifically take into account obstacle avoidance situations in which the robotic system 400 makes simultaneous contact with two adjacent spans of the powerline 101 at a utility pole 102 (e.g., at an insulator 104 mounted thereto).

As outlined in the appendix of U.S. Provisional Patent Application No. 63/048,793, which is incorporated herein by reference, the balancing of the robotic system 400 in an unstable equilibrium configuration (e.g., in the payload extended configuration 422) may employ several mathematical functions. For example, a three-dimensional (3D) model of a span of the powerline 101 (e.g., between two utility poles 102) may estimate the powerline 101 as a discrete string that includes a plurality of masses interconnected using stiff massless springs of equal length (e.g., resulting in the powerline 101 being difficult to stretch, but easy to bend). Using several known parameters for the powerline 101 (e.g., the length, nominal strain, linear mass, and stiffness of the unstretched powerline 101), an expression for the tension in the "stretched" powerline 101 when hanging from utility poles 102 may be generated in terms of the stiffness of each massless spring and the change in length of each spring.

Generally, displacement of the powerline 101 in an upward and downward direction may be considered as minimal, and thus can generally be ignored to simplify the model. Further, displacement of the powerline 101 (e.g., in a side-to-side direction) may be represented as two smooth sections of powerline 101, one on each side of robotic system 400.

A model for the robotic system 400 may include an inverted pendulum on a cart, where motion in an up-and-down is ignored, and where acceleration a side-to-side direction for the cart is coupled to acceleration of the powerline 101 at the location of the cart along the powerline 101. Further, the powerline 101 may be modeled as a vibrating string in horizontal plane since vibration in the up-and-down direction is ignored, as indicated above, resulting in a partial differential equation (PDE) describing the motion of the powerline 101. A discrete approximation for the PDE may be generated using a finite element method (FEM) to yield a finite element solution in matrix form.

Equations of motion relating to the robotic system 400, which may be modeled as a pendulum traveling on a massless cart in a side-to-side direction (e.g., transverse to the direction of powerline 101), may be defined. While the dynamics for the powerline 101 and the pendulum portion of the model for the robotic system 400 may not be coupled, the cart portion of the model for the robotic system 400 and the powerline 101 may be coupled at the point at which the cart is attached to the powerline 101. Consequently, the powerline 101 and robotic system 400 may be considered as applying equal and opposite forces, and may exhibit the same acceleration, at that location. Based on these constraints, an equation of motion (EOM), in matrix form, that incorporates the dynamics for the powerline 101 and the pendulum portion of the model for the robotic system 300, as well as the constraints due to the coupling of the cart to the powerline 101, may be generated. Simplification of the EOM may be performed in part by eliminating values that are dependent on other values in the EOM, resulting in an equation of first-order state-space representation (e.g., in which a current state of a system may be represented by a number of state variables), which may be a convenient form for implementation in a control system.

Possible estimators may derive particular internal states of the robotic system 400 from physical quantities (e.g., acceleration) measured by one or sensors (e.g., motor position sensors, inertial measurement units (IMUs), and the like) located on the robotic system 400. In some embodiments, an extended Kalman filter (EKF) may be used with the estimators to more accurately estimate the internal states employed in the controller based on a series of measurements of the physical quantities that likely include inaccuracies (e.g., noise).

A dynamics model for the one or more actuators employed to maintain stability of the robotic system 400 in an unstable equilibrium configuration may also be employed. In the examples described and shown herein, thrusters (e.g., fans) are employed as actuators. However, gyroscopes or other devices may be employed as the one or more actuators in other examples.

In deriving the model for the actuator(s), a one-to-one relationship may be presumed to exist between an electronic speed control (ESC) signal driving the actuator and a steady state thrust provided by the actuator. As used herein, the ESC signal may regulate the speed of an electric motor that operates the actuator by way of frequency and/or duty cycle of the ESC signal. There may be a time delay between the initiation of an ESC command and a change in thrust, which may be taken into account. In addition, battery voltage effects on actuator speed may also be considered. A dynamics model of the actuator that represents the first order behavior of the actuators, as well as the continuous and discrete time delays exhibited by the actuators, may be derived. The output of the actuator model may then be mathematically coupled to the input of the combined cable/pendulum model described above to create a model for the overall stabilization system.

A potential form of feedback control and associated closed-loop dynamics for a controller for stabilizing the robotic system 400 may be based on the models described above. Various potential code modules and scripts may embody the controller, the models upon which the controller is based, and the like.

Figure 6:
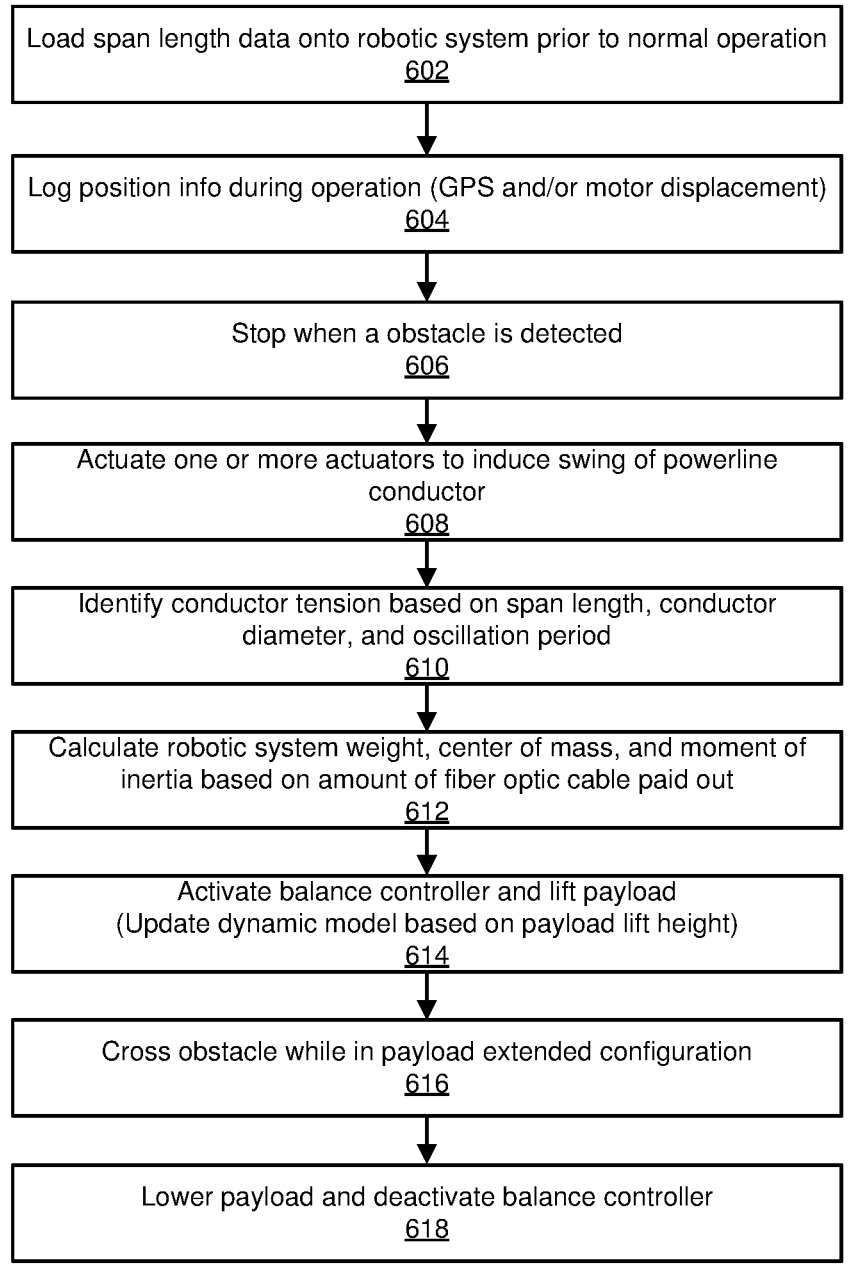
FIG. 6 is a flow diagram of an example method of obstacle avoidance, according to at least one embodiment of the present disclosure.

FIG. 6 is a flow diagram of an example method 600 for obstacle avoidance that may be performed by the robotic system employing a balance controller that is based on the modeling concepts discussed above. In the method 600, at step 602, span length data regarding one or more spans of the powerline over which the robotic system is to travel may be loaded onto the robotic system prior to normal operation (e.g., helical wrapping of the fiber optic cable onto the powerline). Moreover, at step 604, during normal operation, the robotic system may log position information (e.g., GPS information, displacement information based on rotation of motors that cause the robotic system to travel along the powerline, and the like).

At step 606, the robotic system may stop when an obstacle along the powerline (e.g., an insulator, a tap, a change in direction at the utility pole, and so on) is detected. Further, at step 608, one or more actuators (e.g., thrusters, gyroscopes, or the like) may be actuated to intentionally induce a swing of the powerline (e.g., at the fundamental frequency of the span). At step 610, a tension of the powerline may be identified or calculated based on an oscillation period of the powerline of the swing induced by the one or more actuators, as well as the length of the span and the diameter of the powerline, possibly in addition to other parameters describing the powerline. In addition, at step 612, the current weight, center of mass, and moment of inertia of the robotic system may be calculated based on an amount of the fiber optic cable remaining in the payload subsystem, which in turn is based on the amount of the fiber optic cable that has been paid out (e.g., wrapped) onto the powerline from the current segment of the fiber optic cable carried in the payload subsystem.

At step 614, a balance controller may be activated and the payload subsystem may be extended (e.g., raised upward) into the payload extended configuration in anticipation of crossing the detected obstacle. Further, the operation of the balance controller may be based on a dynamic model that may be updated based on at least one of the various measured or calculated parameters, as described above. At step 616, the obstacle may be crossed while the robotic system remains in the payload extended configuration. After the obstacle has been passed, at step 618, the robotic system may lower the payload subsystem back to the payload retracted configuration and may deactivate the balance controller.

Figure 7:
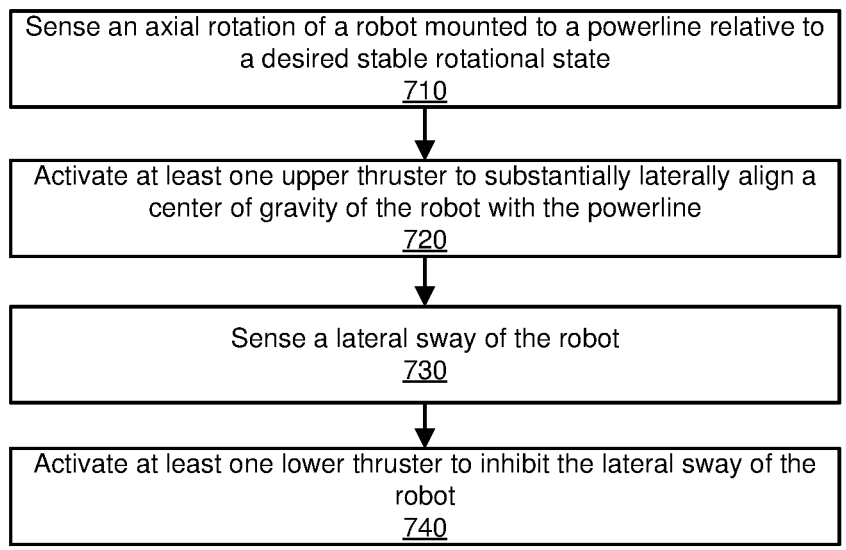
FIG. 7 is a flow diagram of an example method of stabilizing a robot mounted to a powerline, according to at least one embodiment of the present disclosure.

FIG. 7 is a flow diagram of an example method 700 for stabilization of a powerline-crawling robot. At step 710, an axial rotation (e.g., roll) of a robot mounted to a powerline relative to a desired (e.g., upright) stable rotational state may be sensed. For example, the axial rotation may be sensed by an IMU, which may include an accelerometer, gyroscope, or the like.

At step 710, at least one upper thruster, which may be positioned over the powerline supporting the robot, may be activated to substantially laterally align a center of gravity of the robot with the powerline. In some embodiments, multiple upper thrusters may be selectively activated at variable speeds, working together to substantially laterally correct any axial rotation of the robot. Feedback, such as from the IMU, may be provided to one or more thruster controllers to enable the thruster controllers to provide appropriate activation signals to the upper thrusters, as discussed above.

At step 730, a lateral sway of the robot may be sensed, such as by the IMU. The lateral sway may be a lateral motion caused by the flexibility of the powerline supporting the robot. The lateral sway may result from wind, operation of the robot, or the like.

At step 740, at least one lower thruster, which may be positioned closer to the powerline supporting the robot than the upper thrusters, may be activated to inhibit (e.g., reduce or eliminate) the lateral sway of the robot and/or the powerline. In some embodiments, multiple lower thrusters may be selectively activated at variable speeds, working together to substantially laterally correct any sway of the robot. Feedback, such as from the IMU, may be provided to one or more thruster controllers to enable the thruster controllers to provide appropriate activation signals to the lower thrusters, as discussed above.

Figure 8:
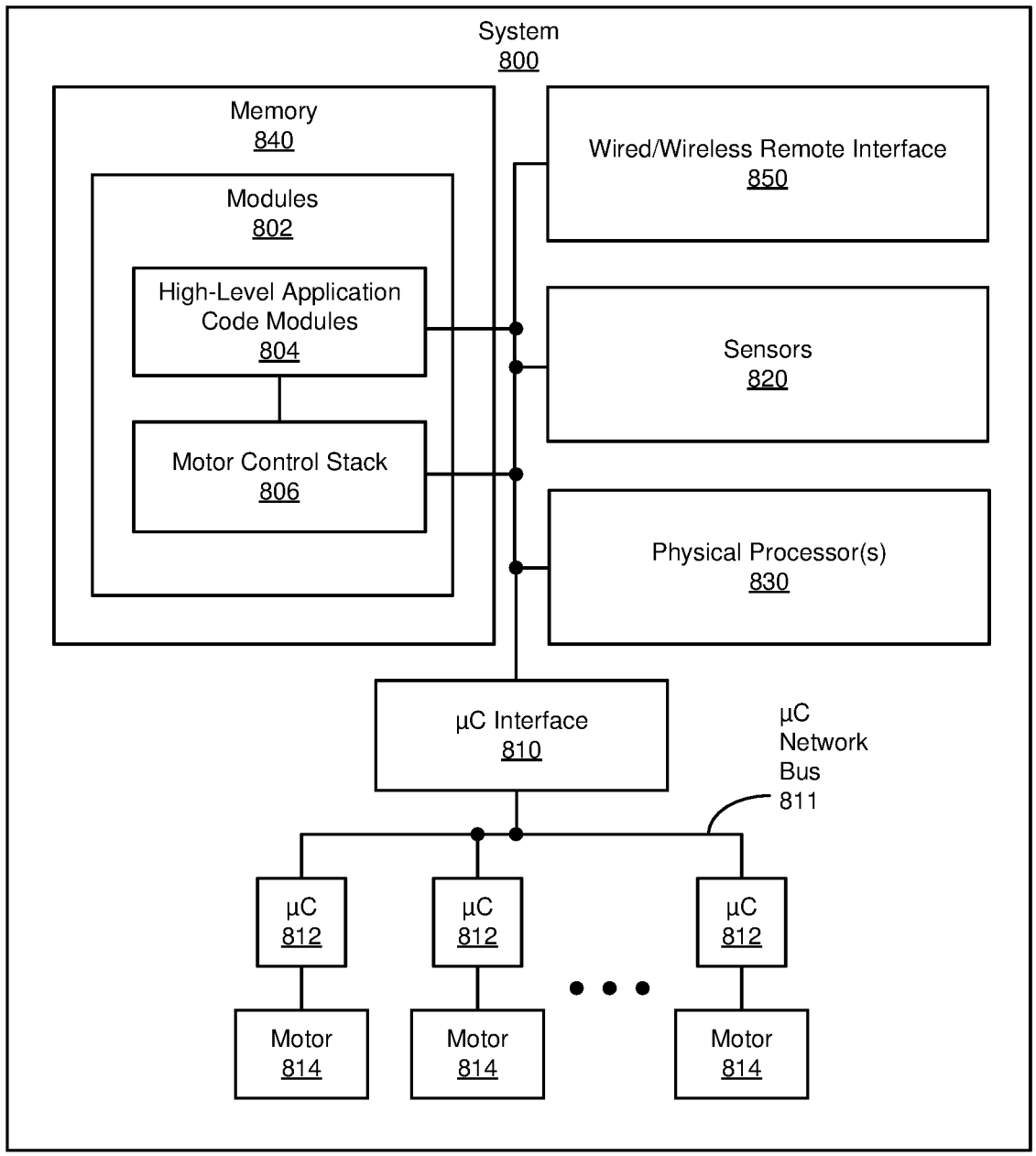
FIG. 8 is a block diagram of an example robotic system for installing a fiber optic cable on a powerline, according to at least one embodiment of the present disclosure.

FIG. 8 is a block diagram of an example system 800 (e.g., serving as the robotic system 200, 300, and/or 400) for installing fiber optic cable 112 onto the powerline 101. As depicted in FIG. 8, the system 800 may include a memory 840 storing various modules 802 executable by one or more physical processors 830 for causing or controlling various operations of the system 800. In some embodiments, the modules 802 may include high-level application code modules 804 that perform high-level tasks that may include, but are not limited to, initialization and/or calibration of various portions of the system 800; motion management for various subsystems (e.g., the drive subsystem end portions 402, the extension subsystem end portions 404, the rotation subsystem 406, and/or the payload subsystem 410) to initiate and monitor various operations (e.g., translation along the powerline 101, rotation of the payload subsystem 410 by the rotation subsystem 406 for installing the fiber optic cable 112, obstacle avoidance (including balancing of the system 800), the system 800 loading and unloading, and so on; command and message logging; reception and interpretation of sensor signals (e.g., from sensors 820); communication with an operator or an external control system (e.g., by way of a wired/wireless remote interface 850); and the like.

Further, in some examples, motion management and related motion functions may be performed by way of a motor control stack 806 that communicates with various motors 814 of the system 800 to perform the various motion operations noted above. In some embodiments, the modules 802 may be received (e.g., via the wired/wireless remote interface 850) and installed by way of software container technology. Also, in some examples, the modules 802 may employ a software framework and related messaging scheme tailored for robotic applications (e.g., the Robot Operating System (ROS) framework).

In some embodiments, the wired/wireless remote interface 850 may include communication circuitry (e.g., a wired or wireless transceiver) to facilitate reception of commands (e.g., from a human operator, etc.) to control various portions of the system 800, as mentioned above, as well as to enable the return of status or logging information.

The sensors 820 may include one or more sensors (e.g., proximity sensors, IMU sensors, limit switches, optical encoders, cameras, etc.) for detecting obstacles; for detecting a current pose, position, orientation, or motion of the system 800 or its various components; and so on. The information provided by the sensors 820 may be employed by the modules 802 or firmware executed by microcontrollers on the system 800 (discussed below) to perform their corresponding tasks.

In some embodiments, each motor 814 of the system 800 may have a corresponding microcontroller 812 and associated (e.g., integrated) memory containing firmware that, when executed by the microcontroller 812, controls the operation of that motor 814. Further, in some examples, the motor control stack 806 may issue commands and receive status information from the microcontrollers 812 by way of a microcontroller interface 810 coupled to a microcontroller network bus 811 to which the microcontrollers 812 are communicatively coupled. In some embodiments, the microcontroller network bus 811 may be a Controller Area Network (CAN) bus, although other types of buses or interfaces may be employed in other examples.

Figure 9:
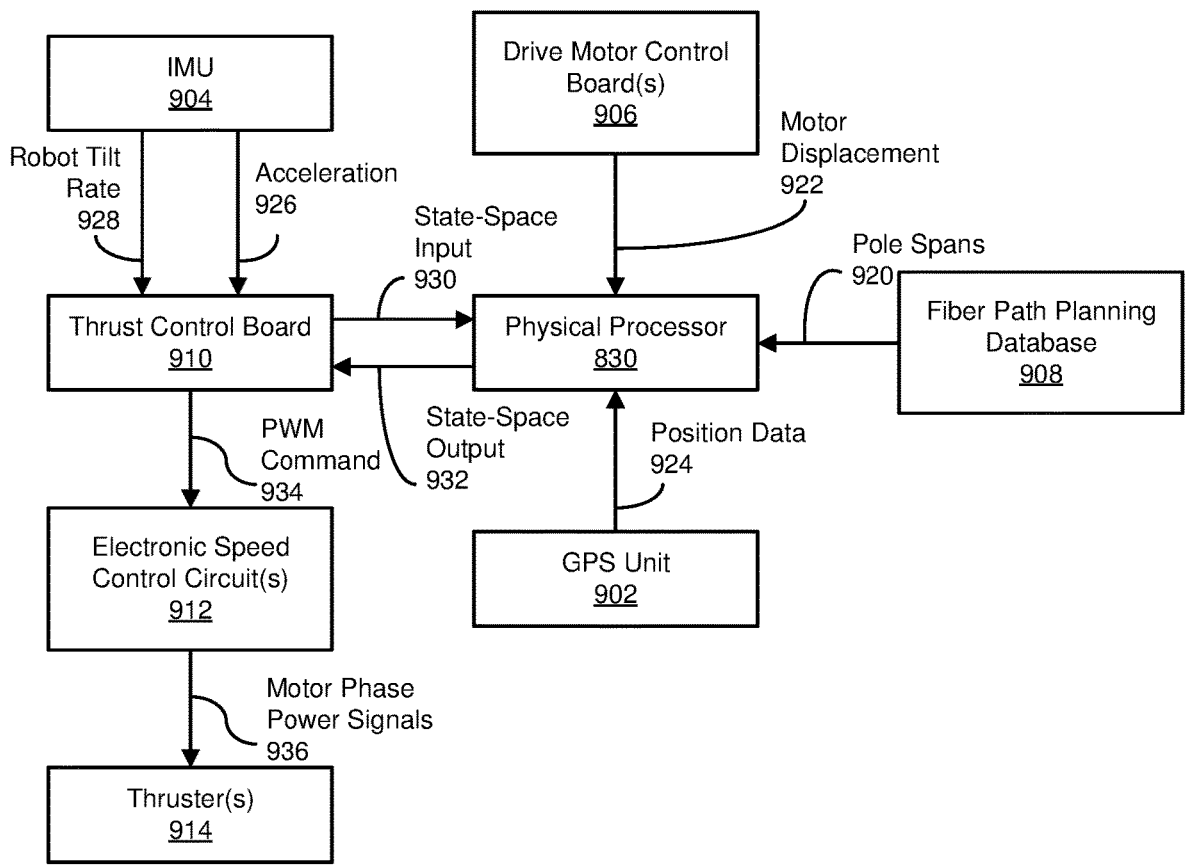
FIG. 9 is a block diagram of an example stabilization system employable within the robotic system of FIG. 8 to balance the robotic system in an unstable equilibrium configuration (e.g., a payload extended configuration), according to at least one embodiment of the present disclosure.

FIG. 9 is a block diagram of an example stabilization system 900 for the system 800 (e.g., the robotic system 200, 300, and/or 400) while the system 800 is in an unstable equilibrium configuration (e.g., payload extended configuration 422, such as for avoiding an obstacle). In at least some examples, the stabilization system 900 may be implemented within the structure of the system 800 as depicted in FIG. 8. For example, a GPS Unit 902 and an IMU 904 of the stabilization system 900 may serve as some of the sensors 820 of FIG. 8. Also, in some embodiments, a thrust control board 910 may serve as a microcontroller 812, while electronic speed control (ESC) circuits 912 and associated thrusters 914 may serve as constituent parts of one or more of the motors 814.

In some embodiments, the physical processor 830 may receive several inputs to implement a balance controller (e.g., a controller using an H-infinity control method and/or a PID method). More specifically, the physical processor 830 may retrieve information (e.g., span length) for one or more pole spans 920 of the powerline 101 from a fiber path planning database 908, which may store information for multiple such spans along which the robotic system 300 and/or 400 is to travel to install the fiber optic cable 112. The physical processor 830 may also receive current positioning information for the system 800, such as position data 924 from the GPS Unit 902 and/or motor displacement information from one or more drive motor control boards 906 (e.g., by way of optical encoders or other devices that may track the number of rotations made by drive wheel motors of the drive subsystem end portions 402 that cause the system 800 to travel along the powerline 101).

In addition, the physical processor 830 may receive state-space input data 930 from a thrust control board 910 so that the balance controller provided by the physical processor 830 may maintain current state-space information for the balance controller, as described above. In some examples, state-space input 930 may include information that indicates or incorporates, for example, a current tilt rate 928 and/or acceleration 926 of the system from one or more IMUs 904, as received by the thrust control board 910. In some embodiments, the thrust control board 910 may generate the state-space input 930, such as a current tilt angle of the system 800 relative to a vertical pose. Further, in some embodiments, the thrust control board 910 may receive state-space output data 932 from the physical processor 830 based on the operation of the balance controller. For example, the state-space output 932 may indicate a force to applied by one or more of the thrusters 914 (e.g., the actuators 430 of the robotic system 400) to maintain the system 800 at or near an upright position to retain rotational stability about the powerline 101. In some embodiments, based on the state-space output 932, the thrust control board 910 may produce one or more pulse-width-modulation (PWM) commands to the ESC circuits 912 so that the ESC circuits 912 generate motor phase power signals 936 for the motors of the thrusters 914 that possess a corresponding frequency and/or duty cycle associated with the intended force to be generated to maintain the system 800 stability atop the powerline 101.

As discussed above in conjunction with FIGS. 1-9, robotic systems and methods described herein may facilitate automatic or semiautomatic installation of significant lengths of fiber optic cable onto a powerline (e.g., by helical wrapping) while avoiding one or more obstacles (e.g., insulators, taps, and/or the like) along the powerline. As described earlier, the avoidance of such obstacles may entail maintaining stability of the robotic system during fiber optic cable deployment and/or during the avoidance maneuver, such as by way of a balance controller, so that normal installation operation of the system may continue after the maneuver without significant human intervention. Such capabilities may result in accelerated and reliable installation of fiber optic cable in underserved geographical areas by way of preexisting power transmission and/or distribution infrastructure. Consequently, such systems and methods may facilitate a substantial reduction in make-ready costs for providing fiber optic cable in such a manner over conventional installation systems.

The following example embodiments are also included in the present disclosure.

Example 1: A system for suspending cable from an overhead powerline, which may include: a payload subsystem for housing and dispensing a cable; a rotation subsystem for winding the cable from the payload subsystem around the powerline; an extension subsystem for raising at least a portion of the payload subsystem vertically upward from the powerline; a stabilization subsystem for stabilizing the system at least when the payload system is extended away from the powerline by the extension subsystem; and a drive subsystem for driving the system along the powerline.

Example 2: The system of Example 1, wherein the stabilization subsystem comprises at least one thruster configured to force air laterally away from the system and to apply an opposing force against the system.

Example 3: The system of Example 2, wherein the at least one thruster comprises at least one fan.

Example 4: The system of Example 2 or 3, wherein the at least one thruster comprises at least four upper thrusters positioned on the system to be above the powerline when the payload system is extended away from the powerline by the extension subsystem, wherein the at least four upper thrusters are configured to be selectively driven to stabilize a rolling of the system.

Example 5: The system of Example 4, wherein the at least four upper thrusters are positioned to be above the powerline also when the extension subsystem is in an initial, retracted state.

Example 6: The system of Example 4 or Example 5, wherein the at least one thruster further comprises at least four lower thrusters positioned on the system closer to the powerline than the at least four upper thrusters, wherein the at least four lower thrusters are configured to be selectively driven to stabilize a sway of the system.

Example 7: The system of any of Examples 2 through 6, wherein the stabilization subsystem comprises at least one controller configured to control operation of the at least one thruster.

Example 8: The system of Example 7, wherein the at least one controller comprises a proportional-integral-derivative (PID) controller.

Example 9: The system of any of Examples 1 through 8, wherein the stabilization subsystem comprises an inertial measurement unit configured to sense at least one of movement or orientation of the system.

Example 10: The system of any of Examples 1 through 9, wherein the drive subsystem comprises at least one roller positioned to engage with the powerline.

Example 11: The system of any of Examples 1 through 10, wherein the cable housed and dispensed by the payload subsystem comprises a fiber optic cable.

Example 12: A stabilization mechanism, which may include: at least one thruster positioned on a frame of a powerline-crawling robot, the at least one thruster positioned and configured to apply a force to the frame when activated; at least one controller configured to control activation and speed of the at least one thruster; and at least one inertial measurement unit configured to sense at least one of lateral movement and axial rotation of the powerline-crawling robot, wherein the at least one controller controls the activation and speed of the at least one thruster based on data from the at least one inertial measurement unit.

Example 13: The stabilization mechanism of Example 12, wherein the at least one thruster comprises at least two upper thrusters positioned on the powerline-crawling robot to be above a powerline on which the powerline-crawling robot is mounted.

Example 14: The stabilization mechanism of Example 13, wherein the at least one thruster further comprises at least two lower thrusters positioned on the powerline-crawling robot to be closer to the powerline than the at least two upper thrusters.

Example 15: The stabilization mechanism of Example 14, wherein the at least two upper thrusters comprise four upper thrusters and the at least two lower thrusters comprise four lower thrusters.

Example 16: The stabilization mechanism of any of Examples 12 through 15, wherein the at least one thruster is positioned to be extended away from the powerline on which the powerline-crawling robot is mounted with an extension system.

Example 17: The stabilization mechanism of any of Examples 12 through 16, wherein the powerline-crawling robot has a center of gravity above the powerline to which the powerline-crawling robot is mounted.

Example 18: A method of stabilizing a robot mounted to a powerline, which method may include: sensing, with an inertial measurement unit, an axial rotation of a robot mounted to a powerline relative to a desired stable rotational state; activating, with a first controller, at least one upper thruster positioned on the robot above the powerline to substantially laterally align a center of gravity of the robot with the powerline; sensing, with the inertial measurement unit, a lateral sway of the robot; and activating, with a second controller, at least one lower thruster positioned on the robot closer to the powerline than the at least one upper thruster to inhibit the lateral sway of the robot.

Example 19: The method of Example 18, further comprising raising the at least one upper thruster upward relative to the powerline.

Example 20: The method of Example 18 or 19, further comprising deploying a fiber optic cable along the powerline while activating the at least one upper thruster and the at least one lower thruster.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A system for suspending cable from an overhead powerline, the system comprising:
    a payload subsystem for housing and dispensing the cable;
    a rotation subsystem for winding the cable from the payload subsystem around the powerline;

an extension subsystem for raising at least a portion of the payload subsystem vertically upward from the powerline;

a stabilization subsystem comprising at least one thruster for stabilizing the system at least when the payload subsystem is extended away from the powerline by the extension subsystem; and a drive subsystem for driving the system along the powerline.

2. The system of claim 1, wherein the at least one thruster is configured to force air laterally away from the system and to apply an opposing force against the system.

3. The system of claim 2, wherein the at least one thruster comprises at least one fan.

4. The system of claim 2, wherein the stabilization subsystem comprises at least one controller configured to control operation of the at least one thruster.

5. The system of claim 4, wherein the at least one controller comprises a proportional-integral-derivative (PID) controller.

6. The system of claim 2, wherein the at least one thruster comprises at least four upper thrusters positioned on the system to be above the powerline when the payload subsystem is extended away from the powerline by the extension subsystem, wherein the at least four upper thrusters are configured to be selectively driven to stabilize a rolling of the system.

7. The system of claim 6, wherein the at least four upper thrusters are positioned to be above the powerline also when the extension subsystem is in an initial, retracted state.

8. The system of claim 6, wherein the at least one thruster further comprises at least four lower thrusters positioned on the system to be closer to the powerline than the at least four upper thrusters, wherein the at least four lower thrusters are configured to be selectively driven to stabilize a sway of the system.

9. The system of claim 1, wherein the stabilization subsystem comprises an inertial measurement unit configured to sense at least one of movement or orientation of the system.

10. The system of claim 1, wherein the drive subsystem comprises at least one roller positioned to engage with the powerline.

11. The system of claim 1, wherein the cable housed and dispensed by the payload subsystem comprises a fiber optic cable.

\* \* \* \* \*